United States Patent
Huhtanen et al.

(10) Patent No.: US 8,829,128 B2
(45) Date of Patent: Sep. 9, 2014

(54) PREPARATION OF POLYPROPYLENE IN THE PRESENCE OF A SINGLE-SITE CATALYST

(75) Inventors: Lauri Huhtanen, Loviisa (FI); Kalle Kallio, Porvoo (FI); Pascal Castro, Helsinki (FI)

(73) Assignee: Borealis AG, Vienna (AT)

( * ) Notice: Subject to any disclaimer, the term of this patent is extended or adjusted under 35 U.S.C. 154(b) by 69 days.

(21) Appl. No.: 13/516,378

(22) PCT Filed: Jun. 16, 2010

(86) PCT No.: PCT/EP2010/058433
§ 371 (c)(1),
(2), (4) Date: Jul. 24, 2012

(87) PCT Pub. No.: WO2011/076443
PCT Pub. Date: Jun. 30, 2011

(65) Prior Publication Data
US 2012/0277384 A1 Nov. 1, 2012

(30) Foreign Application Priority Data

Dec. 22, 2009 (EP) .................... 09015854
Dec. 22, 2009 (EP) .................... 09015898

(51) Int. Cl.
*C08F 4/642* (2006.01)
*C08F 4/6592* (2006.01)
*C08F 10/06* (2006.01)

(52) U.S. Cl.
USPC ........... 526/160; 526/143; 526/165; 526/348; 526/351; 526/943; 502/103; 502/104; 502/107; 502/125; 502/128; 502/152

(58) Field of Classification Search
USPC ......... 502/103, 104, 107, 118, 125, 128, 143, 502/152; 526/143, 160, 165, 943
See application file for complete search history.

(56) References Cited

FOREIGN PATENT DOCUMENTS

EP          0 255 790 A1     2/1998
WO      WO-03/051934 A2     6/2003
WO      WO-2006/069733 A1   7/2006

*Primary Examiner* — Caixia Lu
(74) *Attorney, Agent, or Firm* — Tarolli, Sundheim, Covell & Tummino LLP

(57) ABSTRACT

Process for the preparation of a polypropylene, wherein propylene is polymerized optionally with a comonomer selected from the group consisting of ethylene, a $C_4$-$C_{20}$ α-olefin and mixtures thereof, in the presence of a catalyst system comprising solid catalyst particles, wherein the solid catalyst particles (a) comprise a transition metal compound of formula (I) $L_m R_n MX_q$ (I) wherein "M" is a transition metal of anyone of the groups 3 to 10 of the periodic table (IUPAC), each "X" is independently a monovalent anionic σ-ligand, each "L" is independently an organic ligand which coordinates to the transition metal (M), each "R" is a bridging group linking two organic ligands (L), "m" is 2 or 3, preferably 2, "n" is 0, 1 or 2, preferably 1, "q" is 1, 2 or 3, preferably 2, m+q is equal to the valency of the transition metal (M), (c) comprise a cocatalyst (Co) comprising an element (E) of group 13 of the periodic table (IUPAC), preferably a cocatalyst (Co) comprising a compound of Al, wherein further the loss of activity of the solid catalyst particles during polymerization is at most 20%.

16 Claims, 2 Drawing Sheets

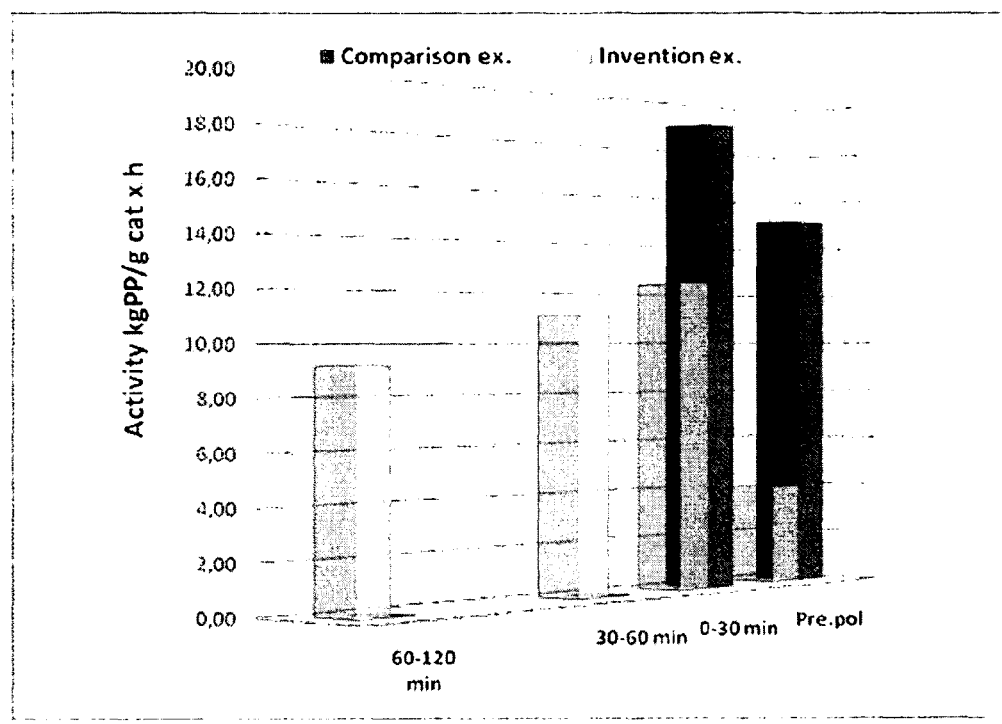
Figure 1: Catalyst productivity during different polymerisation times.

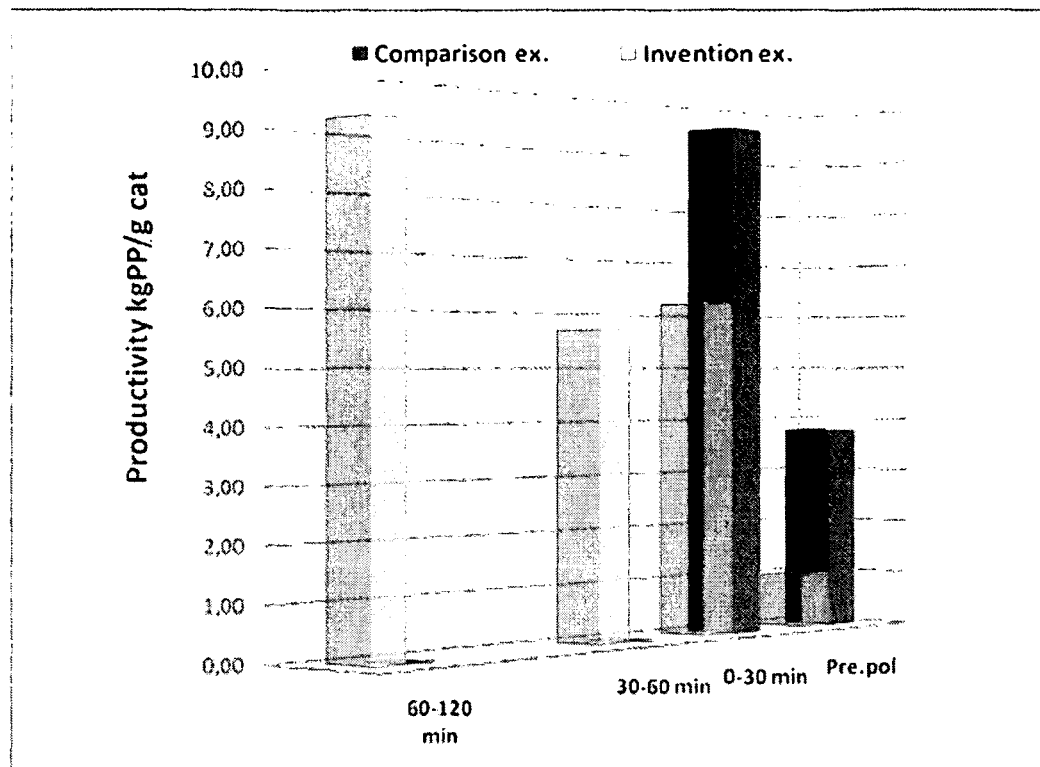
Figure 2: Catalyst activity during different polymerisation times. Catalyst activity in each time range was estimated by excluding the polymer yied(s) produced before each time range

PREPARATION OF POLYPROPYLENE IN THE PRESENCE OF A SINGLE-SITE CATALYST

This application corres. to PCT/EP2010/058433, filed Jun. 16, 2010, which claims priority from European Application Nos. 09015898.1, filed Dec. 22, 2009 and 09015854.4, filed Dec. 22, 2009, the subject matter of which are incorporated herein by reference in their entirety.

The present invention is directed to a new process for the preparation of polypropylene in the presence of a catalyst system with high activity.

Many processes have been developed in the past for the preparation of polypropylene. Single-site catalysts have been become favourable over typical Ziegler-Natta catalysts to produce polypropylene.

At the beginning of the development of single-site catalyst systems only homogeneous systems were available. Such homogeneous catalyst systems are solutions of one or more catalyst components, e.g. a transition metal compound and optionally a cocatalyst. Homogeneous systems are used as liquids in the polymerisation process. Such systems have in general a satisfactory catalytic activity, but their problem has been that the polymer thus produced has a poor morphology (e.g. the end polymer is in a form of a fluff having a low bulk density). As a consequence, operation of slurry and gas phase reactors using a homogeneous catalyst system causes problems in practice for instance in terms of reactor fouling.

BRIEF DESCRIPTION OF THE DRAWINGS

FIG. 1 illustrates catalyst productivity during different polymerisation times.

FIG. 2 illustrates catalyst activity during different polymerisation times. Catalyst activity in each time range was estimated by excluding the polymer yield(s) produced before each time range.

To overcome the problems of the homogeneous catalyst systems supported systems have been developed. These supported systems, known as heterogeneous catalyst systems, comprise carrier materials, such as porous organic and inorganic support materials, like silica, $MgCl_2$ or porous polymeric materials onto which the catalyst is loaded or supported.

However, also supported catalyst systems cause problems. For instance, to mention only one among many, it is difficult to get an even distribution of the catalyst components in the porous carrier material. Further leaching of the catalyst components from the support can occur. Such drawbacks lead to an unsatisfactory polymerisation behaviour of the catalyst, and as a result the morphology of the polymer product thus obtained is also poor. Further such classic heterogeneous catalyst systems show reduced catalyst activity which is of course detrimental as the catalyst amount must be increased which in turn leads to polymer products contaminated with rather high amounts of catalyst residues including silica residues, which might be very detrimental in some product applications.

For this reason a single site catalyst system has been developed which significantly reduces the drawbacks of the known heterogeneous catalyst systems. Such new catalyst systems are are not in need of catalytically inert external support material, and are further featured by spherical particles with low porosity. Such single site catalyst systems enable to increase the output rate of polymers since the bulk density of the polymerized product can be increased. For the first time such new single site catalyst systems have been for instance described in WO 03/051934 or in WO 2006/069733.

These new solid catalyst systems have high amount of catalytically active species in the catalyst system. This feature leads to a high activity of the catalyst, especially at the beginning of the polymerisation process, which tend to generate high temperatures causing melting of the produced material and as a consequence thereof fouling and sheeting in the reactors might occur. Further, due to the high activity of the catalyst at the beginning of the process, the activity will not remain on a desired level during the whole polymerisation process. This might cause problems especially in multistage processes.

Further there is the strong need to develop catalyst systems which are not only able to produce polypropylene with rather high bulk density but also have excellent catalytic activity, long lifetime and which catalysts are produced from acceptable materials in environmental, safety and healthy point of view.

Thus the object of the present invention is to find a suitable process for the preparation of polypropylene in an efficient manner, i.e. using a catalyst having a high activity and a long lifetime. Thus the catalyst should keep its activity in the course of time during polymerisation. In addition the object of the invention is to produce propylene employing solid catalyst particles having produced from materials, which are acceptable materials in environmental, safety and healthy point of view.

The finding of the present invention is that polypropylene must be produced with solid catalyst particles, however without using any external carrier or support material, said solid catalyst particles being prepared using surfactants being not toxic compounds, like perfluorooctanesulfonic acid (PFOS) and/or perfluorooctanoic acid (PFOA) These compounds are known to work as surfactants. A further finding of the present invention is that such solid catalysts gain very high activity in case surfactants are used that are pretreated with a compound comprising an element of group 13 of the periodic table (IUPAC), preferably a compound comprising A1.

Thus in a first embodiment the present invention is directed to a process for the preparation of polypropylene, wherein
(A) solid catalyst particles are produced by
  (a) preparing a solution (A) comprising
    (i) a transition metal compound of formula (I)

$$L_mR_nMX_q \qquad (I)$$

wherein
      "M" is a transition metal of anyone of the groups 3 to 10 of the periodic table (IUPAC),
      each "X" is independently a monovalent anionic σ-ligand,
      each "L" is independently an organic ligand which coordinates to the transition metal (M),
      each "R" is a bridging group linking two organic ligands (L),
      "m" is 2 or 3, preferably 2,
      "n" is 0, 1 or 2, preferably 1,
      "q" is 1, 2 or 3, preferably 2,
      m+q is equal to the valency of the transition metal (M),
    (ii) a cocatalyst (Co) comprising an element (E) of group 13 of the periodic table (IUPAC), preferably a cocatalyst (Co) comprising a compound of A1, and
    (iii) a solvent (A'),
  (b) generating an emulsion by dispersing the solution (A) in a solvent (B) and
    in the presence of a surfactant (S)

wherein
(i) the solvent (B) constitutes the continuous phase of the emulsion and
(ii) the solution (A) constitutes in form of droplets the dispersed phase of the emulsion,
(iii) the transition metal compound of formula (I) and the cocatalyst (Co) are present in the droplets, and
(iv) the surfactant (S) is
  (α) at least one compound (SP) of formula (II) or
  (β) a reaction product (RP) of at least one compound (SP) of formula (II) and a compound (C) comprising an element (E) of group 13 of the periodic table (IUPAC), preferably a compound comprising Al, the formula (II) is

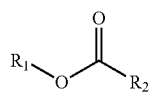

wherein
  $R_1$ is a semi-, highly- or perhalogenated hydrocarbon residue, and
  $R_2$ is a residue of —C($R_3$)=C($R_{3'}$)—$R_4$, wherein $R_3$, $R_4$, $R_{3'}$, are independently from each other selected from the group consisting of H, $C_1$ to $C_{20}$ alkyl, $C_2$ to $C_{20}$ alkenyl, $C_2$ to $C_{20}$ alkinyl,
(c) solidifying said dispersed phase to convert said droplets to solid catalyst particles, and
(d) recovering said solid catalyst particles,
(B) subsequently polymerizing propylene optionally with a comonomer selected from the group consisting of ethylene, a $C_4$-$C_{20}$ α-olefin and mixtures thereof, in the presence of the solid catalyst particles of step (A).

As disclosed above, the essential feature of the present invention is that the solid catalyst particles do not lose their activity or lose only very little activity during polymerisation, i.e. the activity remains stable, or at least reasonable stable during polymerisation conditions.

Thus, according to a preferred process of the present invention
(a) the loss of activity (LA1) of the solid catalyst particles during polymerization is at most 20%, preferably at most 15%, wherein the loss of activity (LA1) is defined by formula (A1)

$$LA1 = \left(1 - \frac{A(60)}{A(30)}\right) \times 100 \tag{A1}$$

and/or
(b) the loss of activity (LA2) of the solid catalyst particles during polymerization is at most 25%, preferably at most 20%, wherein the loss of activity (LA2) is defined by formula (A2)

$$LA2 = \left(1 - \frac{A(120)}{A(60)}\right) \times 100 \tag{A2}$$

wherein
A(30) is the calculated activity for polymerization period of 30 minutes
A(60) is the calculated activity for polymerization period of 60 minutes
A(120) is the calculated activity for polymerization period of 120 minutes.

Additionally and/or alternatively it is preferred that the loss of activity (LA3) of the solid catalyst particles during polymerization is at most 30%, preferably at most 25%, wherein the loss of activity (LA3) is defined by formula (A3)

$$LA3 = \left(1 - \frac{A(180)}{A(120)}\right) \times 100 \tag{A3}$$

wherein
A(120) is the calculated activity for polymerization period of 120 minutes
A(180) is the calculated activity for polymerization period of 180 minutes.

The calculated activity for each polymerization period (A(30) [30 minutes], A(60) [60 minutes], A(120) [120 minutes], A(180) [180 minutes]) is defined in the instant invention as the ratio of calculated productivity and time, i.e. polymerization period, [(calculated productivity)/(time in minutes/60)]. Each polymerization period (30 minutes, 60 minutes, 120 minutes, 180 minutes) mean the polymerization time started after the prepolymerization, In turn the calculated productivity for each polymerization period is the ratio of polymer produced during a specific defined period and catalyst amount used in that period [(polymer yield/catalyst amount]. For the following polymerization periods (30 minutes, 60 minutes, 120 minutes, 180 minutes) the following produced polymer is used for the calculation of productivity:
Polymerization period of 30: The polymer produced in that time is used to calculate productivity
Polymerization period of 60 minutes: The polymer produced in the time frame of 30 minutes after prepolymerization and 60 minutes after prepolymerization is used to calculate productivity
Polymerization period of 120 minutes: The polymer produced in the time frame of 60 minutes after prepolymerization and 120 minutes after prepolymerization is used to calculate productivity
Polymerization period of 180 minutes: The polymer produced in the time frame of 120 minutes after prepolymerization and 180 minutes after prepolymerization is used to calculate productivity In the examples of the present invention the polymerization period used to calculate the loss of activity starts after 15 minutes prepolymerization, i.e. after 15 minutes reactor heating to 70° C. Prepolymerisation time and conditions in general depend on the whole polymerisation type and configuration, and as a process step belong to the normal polymerization technique.

Alternatively (second embodiment) the inventive process can be defined as a process for the preparation of polypropylene, wherein propylene is polymerised optionally with a comonomer selected from the group consisting of ethylene, a $C_4$-$C_{20}$ α-olefin and mixtures thereof, in the presence of solid catalyst particles,
wherein said solid catalyst particles
(a) comprise a transition metal compound of formula (I)

$$L_m R_n MX_q \tag{I}$$

wherein
"M" is a transition metal of anyone of the groups 3 to 10 of the periodic table (IUPAC),
each "X" is independently a monovalent anionic σ-ligand, each "L" is independently an organic ligand which coordinates to the transition metal (M), each "R" is a bridging group linking two organic ligands (L), "m" is 2 or 3, preferably 2, "n" is 0, 1 or 2, preferably 1, "q" is 1, 2 or 3, preferably 2, m+q is equal to the valency of the transition metal (M), (b) comprise a cocatalyst (Co) comprising an element (E) of group 13 of the periodic table (IUPAC), preferably a cocatalyst (Co) comprising a compound of Al, wherein further (i) the loss of activity (LA1) of the solid catalyst particles during polymerization is at most 20%, preferably at most 15%, wherein the loss of activity (LA1) is defined by formula (A1)

$$LA1 = \left(1 - \frac{A(60)}{A(30)}\right) \times 100 \quad (A1)$$

and/or (ii) the loss of activity (LA2) of the solid catalyst particles during polymerization is at most 25%, preferably at most 20%, wherein the loss of activity (LA2) is defined by formula (A2)

$$LA2 = \left(1 - \frac{A(120)}{A(60)}\right) \times 100 \quad (A2)$$

wherein

A(30) is the calculated activity for polymerization period of 30 minutes

A(60) is the calculated activity for polymerization period of 60 minutes

A(120) is the calculated activity for polymerization period of 120 minutes.

Additionally and/or alternatively it is preferred that the loss of activity (LA3) of the solid catalyst particles during polymerization is at most 30%, preferably at most 25%, wherein the loss of activity (LA3) is defined by formula (A3)

$$LA3 = \left(1 - \frac{A(180)}{A(120)}\right) \times 100 \quad (A3)$$

wherein

A(120) is the calculated activity for polymerization period of 120 minutes

A(180) is the calculated activity for polymerization period of 180 minutes.

Preferably the solid catalyst particles as defined in the second embodiment are obtainable, preferably are obtained, by the process step (A) as defined in the first embodiment.

In the following the process is described in more detail. First the preparation and the structure of the solid catalyst particles are described and subsequently the preparation of the polypropylene in the presence of said solid catalyst particles.

As indicated above the solid catalyst particles are preferably obtained by a specific process as defined in step (A) of the first embodiment. The present invention has in particular discovered that the specific selected surfactant (S) used in the preparation of the solid catalyst particles does not contain the environmentally non-desired components as disclosed above. A further finding of the present invention is that such solid catalyst particles with the desired activity in the preparation of polypropylene can be prepared if the used surfactant (S) is the result of pre-treatetement of the compounds (SP) with a compound (C) under the above mentioned conditions.

Thus in a preferred embodiment the surfactant (S) is a reaction product (RP) of at least one compound (SP) of formula (II) and a compound (C) comprising an element (E) of group 13 of the periodic table (IUPAC), preferably a compound comprising Al, like trialkylaluminium and/or aluminoxane. It is possible that at least one compound (SP) is brought in contact with the compound (C) for a short period of time or at least 6 hours at a temperature above −20° C.

The term "solution" throughout the present application indicates that two or more substances are homogenous mixed. At least one of the substances is a solvent in which the other substances (the solutes) are dissolved. In the instant invention the solvent of the solution (A) is the solvent (A') as defined in more detail below, whereas the solutes of the solution (A) are at least the transition metal compound of formula (I) and the cocatalyst (Co).

An "emulsion" according to this invention is a mixture of two substances forming a liquid/liquid at least two phase system. One substance (the dispersed phase) is dispersed in the other (the continuous phase) as droplets. In the present application the continuous phase is the solvent (B) and the dispersed phase (in the form of droplets) is the solution (A) containing the catalyst components.

"Surfactants" according to this invention are agents that lower the surface tension of a liquid and lower the interfacial tension between two phases, here the solution (A) and the solvent (B), and thus enable or facilitate the formation of emulsions as well act as stabilizer in the emulsion.

More precisely, the solvent (A') of the present invention is a solvent which dissolves the components of solid catalyst particles, i.e. at least the transition metal compound of formula (I) and the cocatalyst (Co). Preferably the solvent (A') is an organic solvent (A'). Still more preferably the organic solvent (A') is selected from the group consisting of a linear alkane, cyclic alkane, aromatic hydrocarbon (like toluene, benzene, ethylbenzene, propylbenzene, butylbenzene and/or xylene), and halogen-containing hydrocarbon. Toluene is in particular preferred as a solvent (A') to form the solution (A) with the components of the solid catalyst particles.

The solvent (B), forming the continuous phase, may a single solvent or a mixture of different solvents, wherein solution (A) forms the dispersed phase. The solvent (B) may be immiscible with the solution (A) at least at the conditions (e.g. temperatures) used during the dispersing step (b).

The term "immiscible with the solution (A)" means that the solvent (B) is fully immiscible or partly immiscible i.e. not fully miscible with the dispersed phase solution (A).

Preferably said solvent (B) is inert in relation to the compounds of the solid catalyst particles to be produced. The term "inert in relation to the compounds" means herein that the solvent (B) of the continuous phase is chemically inert, i.e. undergoes no chemical reaction with any catalyst particle forming compound or catalyst particle precursor forming compound (e.g. the transition metal compound of formula (I) and the cocatalyst (Co)). Thus, the solid catalyst particles or any precursor thereof are formed in the droplets from the compounds which originate from the dispersed phase, i.e. are provided to the emulsion in the solution (A) dispersed into the continuous phase forming solvent (B).

It is preferred that the catalyst compounds(s) used for forming the solid catalyst particles (e.g. the transition metal compound of formula (I) and the cocatalyst (Co)), are not soluble in the solvent (B). Preferably, said catalyst compounds(s) (e.g. the transition metal compound of formula (I) and the cocatalyst (Co)) are essentially insoluble in said continuous phase forming solvent (B). The solidified catalyst, i.e. the solid catalyst particles, is also insoluble into the mixture of (B) and (A').

Accordingly the immiscible solvent (B) preferably comprises a halogenated organic solvent, particularly a fluorinated organic solvent and/or a functionalized derivative thereof, still more preferably the immiscible solvent (B) comprises a semi-, highly- or perfluorinated hydrocarbon and/or a functionalized derivative thereof As used throughout the present invention, the phrase "semi fluorinated" defines a compound in which fluorine atoms or halogen atoms constitute at least a third but not more than one-half of the non-carbon substituents, preferably of the hydrogens, on the carbon atoms in the molecule. On the other hand the phrase "highly fluorinated" refers generally to a compound in which fluorine atoms constitute more than one-half but not all of the non-carbon substituents, preferably of the hydrogens, on the carbon atoms in the molecule. Perfluorinated hydrocarbons hydrocarbons refer to those that have all of the non-carbon substituents, preferably all of the hydrogens, on carbon atoms replaced with fluorine, respectively. It is in particular preferred, that said immiscible solvent (B) comprises, i.e. consist of, a perfluorohydrocarbon or a functionalized derivative thereof, preferably $C_3$ to $C_{30}$ perfluoroalkanes, -alkenes or -cycloalkanes, more preferred $C_4$ to $C_{10}$ perfluoro-alkanes, -alkenes or -cycloalkanes, particularly preferred perfluorohexane, perfluoroheptane, perfluorooctane, perfluoro (methylcyclohexane), perfluoro(1,3-dimethylcyclohexane) or a mixture thereof.

These (fluorinated) solvents (B) are chemically very inert and are very poor solvents for polar compounds such as for the solvent (A) and the catalyst particle compounds(s) (e.g. the transition metal compound of formula (I) and the cocatalyst (Co)). Accordingly the reactive compounds (e.g. the transition metal compound of formula (I) and the cocatalyst (Co)) can be kept within the droplet phase so that no relevant reactions in the continuous phase occur, which would worsen the morphology of the solidified catalyst particles.

Due to the above poor solvent properties of the solvent (B), the "droplet form" of the catalyst compounds remains even if the solvent (A) used initially is removed during solidification e.g. by heating the system.

The finding of the present invention is that a specific surfactant (S) must be used for forming the emulsion. After the formation of the emulsion system, said solid catalyst particles are formed in situ from the catalyst compounds, i.e. the transition metal compound of formula (I) and the cocatalyst (Co), in said solution (A).

The surfactant (S) is (i) at least one compound (SP) of formula (II)

and/or (ii) a reaction product (RP) of at least one compound (SP) of formula (II) and a compound (C) comprising an element (E) of group 13 of the periodic table (IUPAC), preferably a compound comprising A1.

The formula (II) is

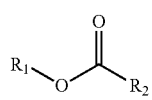
(II)

wherein $R_1$ is a semi-, highly- or perhalogenated hydrocarbon residue, preferably is a semi-, highly- or perfluorinated hydrocarbon residue, and $R_2$ is a residue of $-C(R_3)=C(R_{3'})-R_4$, wherein $R_3$, $R_4$, $R_{3'}$, are independently from each other selected from the group consisting of H, $C_1$ to $C_{20}$ alkyl, $C_2$ to $C_{20}$ alkenyl, $C_2$ to $C_{20}$ alkinyl, In a specifically preferred embodiment the $R_2$ residue of the compound (SP) of formula (II) is $-CHR_3=CH_2$, wherein $R_3$ is selected from the group consisting of H, methyl, ethyl, n-propyl, iso-propyl, n-butyl, preferably H or methyl.

Thus in one embodiment the $R_2$ residue of the compound (SP) of formula (II) is $-CH_2=CH_2$.

As stated above the residue "$R_1$" of the compound (SP) of formula (II) can be a halogenated, like fluorinated, hydrocarbon. Thus the residue "$R_1$" of the compound (SP) of formula (II) are based on halogenated, like fluorinated, hydrocarbons such as linear or branched aliphatic, alicyclic or aromatic halogenated, like fluorinated, hydrocarbons, such as a linear or cyclic halogenated, like fluorinated, alkyl or alkenyl. More preferably such hydrocarbons as defined in this paragraph are preferably semi-, highly- or perfluorinated hydrocarbons. It is in particular appreciated that the $R_1$ residue of the compound (SP) of formula (II) is either a highly- or perhalogenated hydrocarbon, like a highly- or perfluorinated hydrocarbon, such as linear or branched aliphatic, alicyclic or aromatic highly- or perhalogenated, like highly- or perfluorinated, hydrocarbons, such as a linear or cyclic highly- or perhalogenated, like highly- or perfluorinated, alkyl or alkenyl. Concerning the definition of "highly halogenated perhalogenated hydrocarbon" the definition for highly- and perfluorinated hydrocarbons, respectively, is equally applicable. Accordingly the residue "$R_1$" of compound (SP) of formula (II) is preferably a branched or linear highly- or perhalogenated, like highly- or perfluorinated, $C_3$ to $C_{30}$ alkyl, like a branched or linear highly- or perhalogenated, like highly- or perfluorinated, $C_6$ to $C_{30}$ alkyl. It is especially preferred that the residue "$R_2$" has the formula (III)

(III)

wherein

X, X' are independently from each other $C_2$ to $C_{20}$ alkyl or halogen, preferably are independently from each other $C_2$ to $C_{20}$ n-alkyl or F, more preferably are F, X" is halogen, more preferably is F, n is 0 to 30, preferably 1 to 25, most preferably 5 to 20, m is 0 to 10, more preferably 1 to 8, most preferably 2 to 5.

Accordingly in a preferred embodiment the residue "$R_1$" has the formula (IIIa)

(IIIa)

wherein

X is halogen, more is preferably F,

X' is $C_2$ to $C_{20}$ alkyl or halogen, preferably is $C_2$ to $C_{20}$ n-alkyl or F, more preferably is F, X" is halogen, more preferably is F, n is 0 to 30, preferably 1 to 25, most preferably 5 to 20.

In an especially preferred embodiment the residue "R$_1$" of compound (SP) of formula (II) has the formula (IIIb)

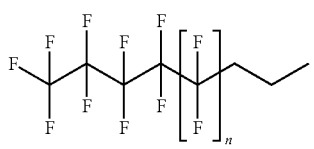

(IIIb)

wherein n is 5 to 30, more preferably 5 to 20.

Keeping the above information in mind the compound (SP) is preferably of formula (IIa)

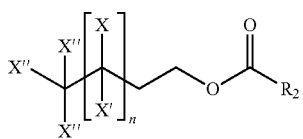

(IIa)

wherein

R$_2$ is a —CR$_3$=CH$_2$, wherein

R$_3$ is selected from the group consisting of H, methyl, ethyl, n-propyl, iso-propyl, n-butyl, preferably H or methyl, X is F, X' is C$_2$ to C$_{20}$ alkyl or halogen, preferably is C$_2$ to C$_{20}$ n-alkyl or F, more preferably is F, X" is halogen, more preferably is F, n is 0 to 30, preferably 1 to 25, most preferably 5 to 20.

Thus in one embodiment the residue R$_2$ of the compound (SP) of formula (IIa) is —CH=CH$_2$.

Therefore in one preferred embodiment the compound (SP) is preferably of formula (IIb)

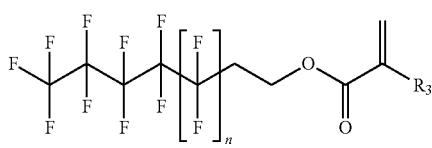

(IIb)

wherein

R$_3$ is selected from the group consisting of H, methyl, ethyl, n-propyl, iso-propyl, n-butyl, preferably is H or methyl, more preferably is H, n is 0 to 30, preferably 1 to 25, most preferably 5 to 20.

As mentioned above the surfactant (S) is in one embodiment at least one compound (SP) as defined in more detail above. Accordingly it is preferred that the surfactant (S) comprises only compounds (SP) as defined above and no other compounds, i.e. surfactants and/or emulsifiers. Thus the surfactant (S) may only be one specific compound (SP) or a mixture of different compounds (SP) as defined above, the latter being preferred. Thus it is especially appreciated that the surfactant (S) is at least one compound (SP) of formula (IIa), more preferably is at least one compound (SP) of formula (IIb). In an especially preferred embodiment the surfactant (S) is a mixture of perfluoroalkylethyl acrylate esters (CAS number 65605-70-1).

In another preferred embodiment the surfactant (S) is a reaction product (RP) of at least one compound (SP) and the compound (C). Accordingly it is appreciated that the surfactant (S) is a reaction product (RP) of at least one compound of (SP) formula (II), more preferably of at least one compound (SP) of formula (IIa), still more preferably of at least one compound (SP) of formula (IIb), and a compound (C) comprising an element (E) of group 13 of the periodic table (IUPAC), preferably a compound comprising A1, like trialkylaluminium and/or aluminoxane, the latter being preferred.

Further it is in particular appreciated that the compound (C) is the same compound as the cocatalyst (Co), being especially preferred methylaluminiumaluminoxane (MAO), optionally containing small amounts of trialkylaluminiun, like trimethylaluminium.

In case the surfactant (S) is a reaction product (RP) of at least one compound (SP) and the compound (C) it is prepared by mixing the compound (SP) and the compound (C), preferably the same as cocatalyst (Co) at temperatures above −20° C., more preferably a temperatures above −10° C. and up to 60° C.

The used temperature can be also above 20° C., like above 30° C. Thus in a preferred embodiment the mixing temperature can be in the range of −5 to 60° C., more preferably in the range of 0 to 45° C.

The temperature used is also dependent on the reaction time between the compound of (SP) and the compound (C) and vice versa.

It is also possible to use longer pre-contacting (reaction) times, like at least 6 hours and can be up to several days depending on the reaction temperature. I.e. according to this alternative longer time is needed, when pre-contacting is done under cold conditions and, if higher temperatures are used, then shorter pre-contacting times are needed.

As suitable solvent for mixing at least one compound (SP) with the compound (C) can be any solvent. However it is in particular preferred that the solvent (B) or the solvent (A') is used. In a preferred embodiment the solvent (A'), like toluene is used.

Typically the volume ratio (at 25° C.) of at least one compound (SP) to the compound (C), preferably the same as cocatalyst (Co), is from 0.02 to 0.15, preferably from 0.04 to 0.10.

In an especially preferred embodiment the surfactant (S) being the reaction product (RP) as defined in the instant invention has been produced before it is used in the claimed process. Thus the at least one compound (SP) and the compound (C), preferably the same as cocatalyst (Co), are pretreated as defined above and subsequently added to instant process.

In a further aspect of the instant invention that the surfactant (S) being at least one compound (SP) and/or the reaction product (RP) is used in a process for the preparation of a catalyst. Further the present invention is directed to the use of the reaction product (RP) as defined herein as an surfactant and/or emulsifier.

The surfactant (S) can be added to the solution (A) or (B) before forming the emulsion. Alternatively the surfactant (S) may be added during the formation of the emulsion. In another embodiment the surfactant (S) may be added separately after the formation of the emulsion to the same. Preferably the surfactant (S) is added during or after the formation of the emulsion, the latter being preferred.

Suitable processes for dispersing the solution (A) within the solvent (B) to form an emulsion is the use of a mechanical device as well as the use of ultrasound for mixing, as known to the skilled person. The process parameters, such as time of mixing, intensity of mixing, type of mixing, power employed for mixing, such as mixer velocity or wavelength of ultrasound employed, viscosity of solvent phase, are used for adjusting the size of the solid catalyst particles.

Regardless of the method used to form the emulsion, its temperature prior to step (c) is preferably −20 to +50° C., more preferably −10 to +40° C., yet more preferably −5 to 30° C., and still more preferably 0 to 20° C. Suitable temperature is dependent on the solvents used.

In step (c) of the process of the invention the catalyst is solidified from the droplets of the dispersed phase obtaining solid catalyst particles. During the solidification the solubility of the solvent of the dispersed phase used in emulsion formation in the continuous phase is increased. This change can be done e.g. by changing the temperature of the emulsion, by diluting the emulsion or by adding any other solubility changing agent into the emulsion or by any combinations of these methods. Other alternatives to affect solidification are prepolymerisation reaction within said dispersed phase, cross-linking (e.g. partially or fully) the catalyst within said dispersed phase by adding a cross-linking agent; and inducing a chemical reaction within the dispersed phase which causes solid catalyst particles to solidify. A preferred method is to use the temperature change method.

In said preferred embodiment solidification is affected by subjecting the emulsion to a temperature change. More preferably the emulsion is subjected to a temperature change e.g. >2° C./min, preferably >10° C./min, still more preferably >30° C./min, and still more preferably >30° C./s. The rate of the temperature change depends on whether more or less rapid temperature change is desired. According to one embodiment the temperature change is selected so that it is capable of causing instant solidification of the catalyst. By "instant solidification" is meant that solidification occurs within 0.01 to 5 seconds, preferably 0.05 to 1 second of exposure to the means by which the temperature change is to be affected. In one embodiment the emulsion is diluted by an additional amount of liquid medium before subjecting it to the solidification step. The appropriate temperature change in the emulsion required to achieve solidification will depend on the nature of the emulsion, any additional components present such as surfactants, the quantity of emulsion involved and/or the means by which the temperature change is affected. Typically, however, the temperature change required to bring about solidification of the catalyst particles will be 5 to 100° C., preferably 10 to 80° C., more preferably 20 to 60° C., e.g. 40 to 60° C., such as about 50° C.

In a preferred embodiment the temperature change is obtained by exposing the emulsion to an environment having a different temperature. Preferably the environment to which the emulsion is exposed is hotter than the emulsion. Thus preferably the environment to which the emulsion is exposed has a temperature which is at least 10 to 150° C., preferably 20 to 120° C., more preferably 30 to 100° C., e.g. 50 to 80° C., such as about 70° C. higher than that of the emulsion. As mentioned above, in a particularly preferred process the emulsion may be prepared at a low temperature and/or cooled to increase the temperature difference between the emulsion and the environment to which it is exposed.

In a particularly preferred process of the invention the environment having a different temperature comprises a liquid, in which the catalyst is substantially insoluble, whereby the heat is transferred via convection. During the solidification the emulsion is preferably contacted with a large surplus of said liquid, in order to achieve a fast convective heat transport and thus a fast heat up of the emulsion, which leads to effective extraction of the solvent of the catalyst phase (catalyst droplets) to the receiving liquid and thus to effective solidification. As a result, a solid catalyst dispersion/suspension is obtained. This dispersion is much more stable compared to the emulsion and is thus easy to handle in any further handling or transporting steps.

Particularly preferred mediums for use as the temperature changing liquid include those used as the continuous phase in step (b), i.e. the solvent (B), of the process hereinbefore described. Still more preferably the medium used as the temperature changing liquid is the same solvent used in step (b), i.e. the solvent (B). Preferred mediums therefore include perfluorohexane, perfluoroheptane, perfluoro(methylcyclohexane), perfluoro(1,3-dimethylcyclohexane) and perfluorooctane.

The solid catalyst particles which are obtained by the solification step may be separated and recovered by any procedure known in the art from the suspension. For example, the suspension may be filtered. Other commonly known methods for isolating are decanting, centrifuging and flotation. The catalyst particles may then be optionally washed and/or dried to remove any solvent residuals present in the particles. The washing and/or drying of the catalyst particles may be carried out in any manner conventional in the art.

For further details, embodiments and examples of the continuous and dispersed phase system, emulsion formation method, and solidification methods reference is made e.g. to the international patent application WO 03/051934 and WO 2006/069733.

The compounds needed for the manufacture of the catalysts particles is at least the transition metal compound of formula (I) and the cocatalyst (Co) as described in further detail below.

Each organic ligand (L) is preferably independently
(a) a substituted or unsubstituted cycloalkyldiene, preferably a cycloalkyldiene selected from the group consisting of unsubstituted cyclopentadiene, substituted cyclopentadiene, monofused derivative of a cyclopentadiene, bifused derivative of a cyclopentadiene and multifused derivative of a cyclopentadiene, or
(b) an acyclic $\eta^1$-, an acyclic $\eta^2$-, an acyclic $\eta^3$-, an acyclic $\eta^4$- or an acyclic $\eta^6$-ligand composed of atoms from Groups 13 to 16 of the periodic table (IUPAC), preferably an acyclic $\eta^1$-, an acyclic $\eta^2$-, an acyclic $\eta^3$-, an acyclic $\eta^4$- or an acyclic $\eta^6$-ligand composed of atoms from Groups 13 to 16 of the periodic table (IUPAC) in which the open chain ligand may be fused with one or two, preferably two, aromatic or non-aromatic rings and/or bear further substituents, or
(c) a cyclic σ-, cyclic $\eta^1$-, a cyclic $\eta^2$-, a cyclic $\eta^3$-, a cyclic $\eta^4$- or a acyclic $\theta^6$-, mono-, bi- or multidentate ligand composed of unsubstituted or substituted mono-, bi- or multicyclic ring systems selected from aromatic or non-aromatic or partially saturated ring systems and containing carbon ring atoms.

More preferably at least one of the organic ligands (L), preferably both organic ligands (L), is(are) selected from the group consisting of unsubstituted cyclopentadienyl, unsubstituted indenyl, unsubstituted tetrahydroindenyl, unsubstituted fluorenyl, substituted cyclopentadienyl, substituted indenyl, substituted tetrahydroindenyl, and substituted fluorenyl.

Further in case the organic ligands (L) are substituted it is preferred that at least one organic lignad (L), preferably both organic ligands (L), comprise(s)
(a) one or more residues independently selected from the group consisting of halogen, $C_1$ to $C_{10}$ alkyl, $C_2$ to $C_{20}$ alkenyl, $C_2$ to $C_{20}$ alkinyl, $C_3$ to $C_{12}$ cycloalkyl, $C_6$ to $C_{20}$ aryl, $C_7$ to $C_{20}$-arylalkyl, $C_3$ to $C_{12}$ cycloalkyl which contains 1, 2, 3 or 4 heteroatom(s) in the ring moiety, $C_6$ to $C_{20}$ heteroaryl and $C_1$ to $C_{20}$ haloalkyl, or more preferably
(b) one or more residues independently selected from the group consisting of halogen, $C_1$ to $C_{10}$ alkyl, $C_3$ to $C_{12}$ cycloalkyl, $C_6$ to $C_{20}$ aryl, $C_7$ to $C_{20}$-arylalkyl, $C_3$ to $C_{12}$ cycloalkyl which contains 1, 2, 3 or 4 heteroatom(s) in the ring moiety, $C_6$ to $C_{20}$ heteroaryl and $C_1$ to $C_{20}$ haloalkyl.

By "σ-ligand" is meant throughout the invention a group bonded to the transition metal (M) at one or more places via a sigma bond.

Further the ligands (X) are preferably independently selected from the group consisting of hydrogen, halogen, $C_1$ to $C_{20}$ alkyl, $C_1$ to $C_{20}$ alkoxy, $C_2$ to $C_{20}$ alkenyl, $C_2$ to $C_{20}$ alkynyl, $C_3$ to $C_{12}$ cycloalkyl, $C_6$ to $C_{20}$ aryl, $C_6$ to $C_{20}$ aryloxy, $C_7$ to $C_{20}$ arylalkyl, $C_7$ to $C_{20}$ arylalkenyl, —SR", —PR"$_3$, —SiR"$_3$, —OSiR"$_3$ and —NR"$_2$, wherein each R" is independently hydrogen, $C_1$ to $C_{20}$ alkyl, $C_2$ to $C_{20}$ alkenyl, $C_2$ to $C_{20}$ alkynyl, $C_3$ to $C_{12}$ cycloalkyl or $C_6$ to $C_{20}$ aryl.

Additionally the bridging group (R) may a bridge of 1 to 7 atoms length, preferably with at least one heteroatom. It is in particular appreciated that the bridging group(s) (R) has (have) the formula (IV)

$$-Y(R')(R'')- \qquad (IV)$$

wherein
Y is carbon (C), silicon (Si) or germanium (Ge), and
R', R" are independently selected from the group consisting of is H, $C_1$ to $C_{20}$ alkyl, $C_4$ to
$C_{10}$ cycloalkyl, $C_6$ to $C_{12}$ aryl, $C_7$ to $C_{12}$ arylalkyl, or trimethylsilyl.

According to a preferred embodiment said transition metal compound of formula (I) is a group of compounds known as metallocenes. Said metallocenes bear at least one organic ligand, generally 1, 2 or 3, e.g. 1 or 2, which is η-bonded to the metal, e.g. a $η^2$- to $η^6$-ligand, such as a $η^5$-ligand.

Preferably, a metallocene according to this invention is a transition metal of anyone of the groups 4 to 6 of the periodic table (IUPAC), suitably titanocene, zirconocene or hafnocene, which contains at least one $η^5$-ligand, which is an optionally substituted cyclopentadienyl, an optionally substituted indenyl, an optionally substituted tetrahydroindenyl or an optionally substituted fluorenyl. Thus the transition metal compound has preferably the formula (V)

$$(Cp)_2R_nMX_2 \qquad (V)$$

wherein
"M" is zirconium (Zr), hafnium (Hf), or titanium (Ti), preferably zirconium (Zr) or hafnium (Hf),
each "X" is independently a monovalent anionic σ-ligand, preferably selected from the group consisting of hydrogen, halogen, $C_1$ to $C_{20}$ alkyl, $C_1$ to $C_{20}$ alkoxy, $C_2$ to $C_{20}$ alkenyl, $C_1$ to $C_{20}$ alkynyl, $C_3$ to $C_{12}$ cycloalkyl, $C_6$ to $C_{20}$ aryl, $C_6$ to $C_{20}$ aryloxy, $C_7$ to $C_{20}$ arylalkyl, $C_7$ to $C_{20}$ arylalkenyl, —SR", —PR"$_3$, —SiR"$_3$, —OSiR"$_3$ and —NR"$_2$, wherein each R" is independently hydrogen, $C_1$ to $C_{20}$ alkyl, $C_2$ to $C_{20}$ alkenyl, $C_2$ to $C_{20}$ alkynyl, $C_3$ to $C_{12}$ cycloalkyl or $C_6$ to $C_{20}$ aryl, more preferably each "X" is Cl,
each "Cp" is independently an unsaturated organic cyclic ligand which coordinates to the transition metal (M),
"R" is a bridging group linking two organic ligands (L), preferably the bridging group (R) has the formula (IV)
"n" is 0 or 1, preferably 1, and
at least one "Cp"-ligand, preferably both "Cp"-ligands, is(are) selected from the group consisting of unsubstituted cyclopentadienyl, unsubstituted indenyl, unsubstituted tetrahydroindenyl, unsubstituted fluorenyl, substituted cyclopentadienyl, substituted indenyl, substituted tetrahydroindenyl, and substituted fluorenyl, preferably substituted indenyl.

The substituted Cp-ligand(s) may have one or more substituent(s) being selected form the group consisting of halogen, hydrocarbyl (e.g. linear $C_1$ to $C_{20}$ alkyl, branched $C_3$ to $C_{20}$ alkyl, linear $C_1$ to $C_{20}$ alkenyl, branched $C_4$ to $C_{20}$ alkenyl, $C_2$ to $C_{20}$ alkinyl, $C_3$ to $C_{12}$ cycloalkyl, $C_1$ to $C_{20}$ alkyl substituted $C_5$ to $C_{20}$ cycloalkyl, $C_5$ to $C_{20}$ cycloakyl substituted $C_1$ to $C_{20}$ alkyl wherein the cycloakyl residue is substituted by $C_1$ to $C_{20}$ alkyl, $C_6$ to $C_{20}$ aryl, $C_7$ to $C_{20}$ arylalkyl, $C_3$ to $C_{12}$-cycloalkyl which contains 1, 2, 3 or 4 heteroatom(s) in the ring moiety, $C_6$ to $C_{20}$-heteroaryl, $C_1$ to $C_{20}$-haloalkyl, —SiR"$_3$, —SR", —PR"$_2$ or —NR"$_2$, each R" is independently a hydrogen or hydrocarbyl (e.g. $C_1$ to $C_{20}$ alkyl, $C_1$ to $C_{20}$ alkenyl, $C_2$ to $C_{20}$ alkinyl, $C_3$ to $C_{12}$ cycloalkyl, or $C_6$ to $C_{20}$ aryl) or e.g. in case of —NR"$_3$, the two substituents R" can form a ring, e.g. five- or six-membered ring, together with the nitrogen atom wherein they are attached to.

Further "R" of formula (V) is preferably a bridge of 1 to 7 atoms, e.g. a bridge of 1 to 4 C-atoms and 0 to 4 heteroatoms, wherein the heteroatom(s) can be e.g. silicon (Si), germanium (Ge) and/or oxygen (0) atom(s), whereby each of the bridge atoms may bear independently substituents, such as $C_1$ to $C_{20}$-alkyl, tri($C_1$ to $C_{20}$-alkyl)silyl, tri($C_1$ to $C_{20}$-alkyl)siloxy or $C_6$ to $C_{20}$-aryl substituents; or a bridge of 1 to 3, e.g. one or two, hetero atoms, such as silicon (Si), germanium (Ge) and/or oxygen (O) atom(s), e.g. —SiR$^1_2$—, wherein each $R^1$ is independently $C_1$ to $C_{20}$-alkyl, $C_4$ to $C_{10}$ cycloalkyl, $C_6$ to $C_{20}$-aryl or tri($C_1$ to $C_{20}$-alkyl)silyl-residue, such as trimethylsilyl-.

The "Cp"-ligand of formula (V) is preferably cyclopentadienyl, indenyl, tetrahydroindenyl or fluorenyl, optionally substituted as defined above and may further bear a fused ring of 3 to 7 atoms, e.g. 4, 5 or 6, which ring may be aromatic or partially saturated.

In a suitable subgroup of the compounds of formula (V) each "Cp"-ligand independently bears one or more, like 2, substituents selected from $C_1$ to $C_{20}$-alkyl, $C_5$ to $C_{20}$ cycloakyl substituted $C_1$ to $C_{20}$ alkyl wherein the cycloakyl residue is substituted by $C_1$ to $C_{20}$ alkyl, $C_6$ to $C_{20}$-aryl, $C_7$ to $C_{20}$-arylalkyl (wherein the aryl ring alone or as a part of a further moiety may further be substituted as indicated above), wherein R" is as indicated above, preferably $C_1$ to $C_{20}$-alkyl,
the ligand "X" is hydrogen (H), halogen, $C_1$ to $C_{20}$-alkyl, $C_1$ to $C_{20}$-alkoxy, $C_6$ to $C_{20}$-aryl, $C_7$ to $C_{20}$-arylalkenyl or —NR"$_2$ as defined above, e.g. —N($C_1$ to $C_{20}$-alkyl)$_2$, and
the bridging group "R" is a methylene, ethylene or a silyl bridge, whereby the silyl can be substituted as defined above, e.g. a dimethylsilyl=, methylphenylsilyl=, methylcylohexylsilyl=, or trimethylsilylmethylsilyl=-bridge.

A specific subgroup includes the well known metallocenes of Zr, Hf and Ti with one or two, e.g. two, organic ligands (L) which may be bridged or unbridged cyclopentadienyl ligands optionally substituted with e.g. siloxy, alkyl and/or aryl as defined above, or with two unbridged or bridged indenyl ligands optionally substituted in any of the ring moieties with e.g. alkyl and/or aryl as defined above, e.g. at 2-, 3-, 4- and/or 7-positions. As specific examples e.g. bis (alkylcyclopentadienyl) Zr (or Ti or Hf) dihalogenides can be mentioned, such as bis-(n-butylcyclopentadienyl)ZrCl$_2$ and bis-(n-butylcyclopentadienyl)HfCl$_2$, see e.g. EP 129 368. One typical metallocene moiety is rac-R$_2$Si(2-Me-4-PhInd)$_2$ZrCl$_2$, wherein each R is independently an linear or cyclic alkyl of 1 to 10 C atoms, and wherein the Ph group can optionally be substituted by an alkyl group of 1 to 10 atoms, as one examples can be mentioned Rac-Me$_2$Si(2-Me-4-PhInd)$_2$ZrCl$_2$ used in polypropylene polymerisation.

Examples of compounds wherein the metal atom bears a-NR"$_2$ ligand are disclosed i.e. in WO 98/56831 and WO 00/34341. The contents of the documents are incorporated herein by reference. Further metallocenes are described e.g. in EP 260 130. As further examples of usable metallocenes may also be found e.g. from WO 97/28170, WO 98/46616, WO 98/49208, WO 99/12981, WO 99/19335, WO 98/56831, WO 00/34341, EP 423 101 and EP 537 130 as well as V. C. Gibson et al., in Angew. Chem. Int. Ed., engl., vol 38, 1999, pp 428-447, the disclosures of which are incorporated herein by reference.

Said transition metal compounds of formula (I) and (V) being of metallocene type and their preparation are well known in the art. Metallocenes as defined in the instant invention are particularly preferred.

Alternatively, in a further subgroup of the metallocene compounds, the transition metal (M) bears a "Cp"-ligand as defined above and additionally a $\eta^1$- or $\eta^2$-ligand, wherein said ligands may or may not be bridged to each other. This subgroup includes so called "scorpionate compounds" (with constrained geometry) in which the transition metal (M) is complexed by a $\eta^5$-ligand bridged to a $\eta^1$- or $\eta^2$-ligand, preferably $\eta^1$- (for example σ-bonded) ligand, e.g. a metal complex of a "Cp"-ligand as defined above, e.g. a cyclopentadienyl group, which bears, via a bridge member, an acyclic or cyclic group containing at least one heteroatom, e.g. —NR"$_2$ as defined above. Such compounds are described e.g. in WO 96/13529, the contents of which are incorporated herein by reference.

Any alkyl, alkenyl or alkynyl residue referred above alone or as a part of a moiety may be linear or branched, and contain preferably of up to 9, e.g. of up to 6, carbon atoms. Aryl is preferably phenyl or naphthalene. Halogen means F, Cl, Br or I, preferably Cl.

Another subgroup of the transition metal compounds of formula (I) usable in the present invention is known as non-metallocenes wherein the transition metal (M) (preferably a Group 4 to 6 transition metal, suitably Ti, Zr or Hf) has a coordination ligand other than cyclopentadienyl ligand.

The term "non-metallocene" used herein means compounds, which bear no cyclopentadienyl ligands or fused derivatives thereof, but one or more non-cyclopentadienyl η-, or σ-, mono-, bi- or multidentate ligand. Such ligands can be chosen e.g. from (a) acyclic, $\eta^1$- to $\eta^4$- or $\eta^6$-ligands composed of atoms from Groups 13 to 16 of the periodic table (IUPAC), e.g. an acyclic pentadienyl ligand wherein the chain consists of carbon atoms and optionally one or more heteroatoms from groups 13 to 16 (IUPAC), and in which the open chain ligand may be fused with one or two, preferably two, aromatic or non-aromatic rings and/or bear further substituents (see e.g. WO 01/70395, WO 97/10248 and WO 99/41290), or (b) cyclic σ-, $\eta^1$- to $\eta^4$- or $\eta^6$-, mono-, bi- or multidentate ligands composed of unsubstituted or substituted mono-, bi- or multicyclic ring systems, e.g. aromatic or non-aromatic or partially saturated ring systems, containing carbon ring atoms and optionally one or more heteroatoms selected from groups 15 and 16 of the periodic table (IUPAC) (see e.g. WO 99/10353).

Bi- or multidentate ring systems include also bridged ring systems wherein each ring is linked via a bridging group, e.g. via an atom from groups 15 or 16 of the periodic table (IUPAC), e.g. N, O or S, to the transition metal (M) (see e.g. WO 02/060963). As examples of such compounds, i.a. transition metal complexes with nitrogen-based, cyclic or acyclic aliphatic or aromatic ligands, e.g. such as those described in WO 99/10353 or in the Review of V. C. Gibson at al., in Angew. Chem. Int. Ed., engl., vol 38, 1999, pp 428-447, or with oxygen-based ligands, such as group 4 metal complexes bearing bidentate cyclic or acyclic aliphatic or aromatic alkoxide ligands, e.g. optionally substituted, bridged bisphenolic ligands (see i.a. the above review of Gibson et al). Further specific examples of non-$\eta^5$-ligands are amides, amide-diphosphane, amidinato, aminopyridinate, benzamidinate, azacycloalkenyl, such as triazabicycloalkenyl, allyl, beta-diketimate and aryloxide. The disclosures of the above documents are incorporated herein by reference.

The preparation of metallocenes and non-metallocenes, and the organic ligands thereof, usable in the invention is well documented in the prior art, and reference is made e.g. to the above cited documents. Some of said compounds are also commercially available. Thus, said transition metal compounds can be prepared according to or analogously to the methods described in the literature, e.g. by first preparing the organic ligand moiety and then metallating said organic ligand ($\eta$-ligand) with a transition metal. Alternatively, a metal ion of an existing metallocene can be exchanged for another metal ion through transmetallation.

As a further requirement the inventive catalyst system must contain a cocatalyst (Co), wherein preferably the cocatalyst (Co) comprises an element of group 13 of the periodic table (IUPAC). Thus the cocatalyst (Co) comprises for instance aluminium (A1) or boron (B).

In a preferred embodiment the cocatalyst (Co) comprises a compound of A1. Examples of such cocatalyst (Co) are organo aluminium compounds, such as trialkylaluminium compound and/or aluminoxane compound, the latter especially preferred.

Further aluminoxane cocatalysts are described i.a. in WO 94/28034 which is incorporated herein by reference. These are linear or cyclic oligomers of having up to 40, preferably 3 to 20, -(A1(R''')O)— repeating units (wherein R''' is hydrogen, $C_1$ to $C_{10}$-alkyl (preferably methyl) or $C_6$ to $C_{18}$-aryl or mixtures thereof).

Such compounds of A1, preferably aluminoxanes, can be used as the only compound in the cocatalyst (Co) or together with other cocatalyst compound(s). Thus besides or in addition to the compounds of A1, i.e. the aluminoxanes, other cation complex forming cocatalyst compounds (Co), like boron compounds can be used. Said cocatalysts are commercially available or can be prepared according to the prior art literature. Preferably however the in the manufacture of the catalyst particles only compounds of A1 as cocatalyst (Co) are employed.

In particular preferred cocatalysts (Co) are the aluminoxanes, in particular the $C_1$ to $C_{10}$-alkylaluminoxanes, most particularly methylaluminoxane (MAO).

Further the mole-ratio [E/M] between the element (E) of group 13 of the periodic table (IUPAC), preferably aluminium (A1) and/or boron (B), more preferably aluminium (A1), to the transition metal (M) is preferably in the mol range of E/M 50/1 to 500/1 mol/mol, preferably in the range of 100/1 to 400/1 mol/mol, more preferably 200/1 to 300/1 mol/mol.

The above defined process leads also to new catalyst particles as defined above, which can be used in the polymerization of polypropylene. This new catalyst particle is further defined by the features below.

Accordingly the used solid catalyst particles
(a) comprise a transition metal compound of formula (I)

wherein
"M" is a transition metal of anyone of the groups 3 to 10 of the periodic table (IUPAC),
each "X" is independently a monovalent anionic σ-ligand,
each "L" is independently an organic ligand which coordinates to the transition metal (M),
each "R" is a bridging group linking two organic ligands (L),
"m" is 2 or 3, preferably 2,
"n" is 0, 1 or 2, preferably 1,
"q" is 1, 2 or 3, preferably 2,
m+q is equal to the valency of the transition metal (M), and
(c) comprise a cocatalyst (Co) comprising an element (E) of group 13 of the periodic table (IUPAC), preferably a cocatalyst (Co) comprising a compound of Al,
wherein further said solid catalyst particles have
(i) a loss of activity (LA1) during polymerization, in particular during propylene homopolymer polymerization, of at most 20%, preferably of at most 15%, wherein the loss of activity (LA1) is defined by formula (A1)

$$LA1 = \left(1 - \frac{A(60)}{A(30)}\right) \times 100 \quad (A1)$$

and/or
(ii) a loss of activity (LA2) during polymerization, in particular during propylene homopolymer polymerization, of at most 25%, preferably of at most 20%, wherein the loss of activity (LA2) is defined by formula (A2)

$$LA2 = \left(1 - \frac{A(120)}{A(60)}\right) \times 100 \quad (A2)$$

wherein
A(30) is the calculated activity for polymerization period of 30 minutes
A(60) is the calculated activity for polymerization period of 60 minutes
A(120) is the calculated activity for polymerization period of 120 minutes.

Additionally and/or alternatively it is preferred that the solid catalyst particles have a loss of activity (LA3) during polymerization, in particular during propylene homopolymer polymerization, of at most 30%, preferably of at most 25%, wherein the loss of activity (LA3) is defined by formula (A3)

$$LA3 = \left(1 - \frac{A(180)}{A(120)}\right) \times 100 \quad (A3)$$

wherein
A(120) is the calculated activity for polymerization period of 120 minutes
A(180) is the calculated activity for polymerization period of 180 minutes.

Preferred transition metal compounds of formula (I) and cocatalysts (Co) are those as defined above.

However this new solid catalyst particle is not only featured by very high productivity and/or activity after long polymerization time but additionally also by a moderate productivity and/or activity at the beginning polymerization process. This catalytic behaviour avoids any overheating at the polymerization start and connected therewith any reactor fouling. On the other hand the long lifetime of the catalyst particle enables the production of polypropylene after a time period where other catalysts are already inactive. These features broaden the operability window of polymerisation processes. Especially these features will show their benefits on multistage processes, although not restricting to those.

Additionally the inventive solid catalyst particles are featured by the fact that it does not comprise any catalytically inert support material, such as organic and inorganic support materials, like silica, MgCl$_2$ or porous polymeric material. As a consequence the catalyst particles have a rather low surface area and low porosity as a result of their special preparation method.

Moreover the inventive solid catalyst particles typically have a mean particle size of not more than 500 μm, i.e. preferably in the range of 2 to 500 μm, more preferably 5 to 200 μm. It is in particular preferred that the mean particle size is below 80 μm, still more preferably below 70 μm. A preferred range for the mean particle size is 5 to 80 μm, more preferred 10 to 60 μm. In some cases the mean particle size is in the range of 20 to 50 μm.

The process for the preparation of polypropylene in which the above defined solid catalyst particles is employed can be a single stage process using a bulk phase, slurry phase or gas phase reactor. However it is preferred that the polypropylene is produced in a multistage process in which the solid catalyst particles of the instant invention are employed.

Accordingly it is preferred that the polypropylene is produced in a process comprising the steps
(i) polymerising propylene and optionally at least one comonomer selected from the group consisting of ethylene and C$_4$ to C$_{20}$ α-olefins in a first stage, and
(ii) transferring the polypropylene of the first stage to a second stage where (co)polymerisation is continued to prepare another polypropylene,
with the proviso that at least in the first stage solid catalyst particles are present as defined in the instant invention.

Even more preferred in both stages the catalyst particles as defined in the instant invention are present.

Accordingly with the process of the present invention a propylene homopolymer or a propylene copolymer is obtainable.

Further, due to the use of at least two polymerization stages it is possible to produce polypropylene being unimodal or multimodal, like bimodal in view of the molecular weight distribution and/or the comonomer content distribution.

The expression "multimodal" or "bimodal" used herein refers to the modality of the polymer, i.e.
the form of its molecular weight distribution curve, which is the graph of the molecular weight fraction as a function of its molecular weight, or
the form of its comonomer content distribution curve, which is the graph of the comonomer content as a function of the molecular weight of the polymer fractions.

In case a propylene homopolymer is produced in an at least two stage process, the propylene homopolymer of the first stage and the propylene homopolymer in the second stage may differ in the molecular weight. Thus the propylene homopolymer—if it is not unimodal—is multimodal, like bimodal, in view of its molecular weight distribution curve.

The expression homopolymer used in the instant invention relates to a polypropylene that consists substantially, i.e. of at least 99 wt.-%, preferably of at least 99.5 wt.-%, more preferably of at least 99.8 wt.-%, of propylene units. In a preferred embodiment only propylene units in the propylene homopolymer are detectable. The comonomer content can be determined with FT infrared spectroscopy, as described below in the examples.

In a further aspect the polypropylene can be a propylene copolymer. A propylene copolymer can be either a random propylene copolymer or a heterophasic propylene copolymer. The term "random copolymer" has to be preferably understood according to IUPAC, i.e. as a polymer in which the probability of finding a given monomeric unit at any given site in the polymer chain is independent.

In case the polypropylene is a random propylene copolymer it comprises monomers copolymerizable with propylene, for example comonomers such as ethylene and/or $C_4$ to $C_{20}$ alpha-olefins, in particular ethylene and/or $C_4$ to $C_{10}$ alpha-olefins, e.g. 1-butene and/or 1-hexene. Preferably the random propylene copolymer comprises, especially consist of, monomers copolymerizable with propylene from the group consisting of ethylene, 1-butene and 1-hexene. More specifically the random propylene copolymer comprises—apart from propylene—units derivable from ethylene and/or 1-butene. In a preferred embodiment the random propylene copolymer comprises units derivable from ethylene and propylene only. The comonomer content in the random propylene copolymer is preferably relatively low, i.e. up to 6.0 wt.-%, more preferably 0.5 to 6.0 wt.-%, still more preferably 0.5 to 4.0 wt.-%.

If the random propylene copolymer is produced in an at least two stage process the comonomer content in the polymer produced in the second stage is preferably the same or higher than in the polymer produced in the first stage. Accordingly with the present process homo/random or random/random propylene copolymers can be produced. Accordingly for instance in one embodiment in a first stage a propylene homopolymer is produced whereas in the second stage a random propylene copolymer (homo/random propylene copolymer) whereas in another embodiment in a first stage as well as in the second stage a random propylene copolymer (random/random propylene copolymer) is produced.

Different to the random propylene copolymer the hetrophasic propylene copolymer is featured by a matrix phase in which a elastomeric phase is dispersed. The amount of the elastomeric phase (rubber phase) in the heterophasic copolymer is typically in the range of 10 to 30 wt-%, like 15 to 25 wt-%. However, higher amounts of rubber phase are not excluded. Further the matrix can be either a propylene homopolymer or a random propylene copolymer. Typically the comonomer, preferably ethylene, content in matrix is not more than 6.0 wt.-%. The elastomeric phase is featured by rather high amounts of comonomer, preferably ethylene, like of at least 15 wt.-% or of at least 35 wt.-%. Such a heterophasic propylene copolymer is preferably produced in an at least two stage process, wherein in the first stage the matrix is produced and in the second stage the elastomeric phase.

As stated above, the inventive process comprises at least two stages, however the process might comprise further stages if necessary, like a prepolymerization stage.

The first stage (a) may comprise at least one slurry reactor, preferably a loop reactor, and optionally at least one gas phase reactor, typically one or two gas phase reactor(s). The slurry reactor may be a bulk reactor, where the reaction medium is propylene.

The second stage comprises at least one gas phase reactor, typically 1 or 2 gas phase reactor(s).

Thus in a preferred embodiment the first stage is constituted by a slurry reactor, i.e. bulk reactor, where a first propylene homopolymer or random propylene copolymer is formed, and the second stage is constituted by at least one gas phase reactor, preferably one or two gas phase reactor(s), in which a second polypropylene is produced, like a further propylene homopolymer or random propylene. Alternatively in case a heterophasic polypropylene is produced in the second stage the elastomeric component is formed.

Of course, due to the multistage nature of the inventive process both fractions of the polypropylene after being produced are inseparably mixed with each other.

The properties of the polypropylene produced in the gas phase reactor(s) such as for instance its comonomer content, in particular ethylene content, may nevertheless be determined by considering the corresponding values for the slurry reactor product and the final polypropylene and taking into account the production split.

The amount of monomers to be fed in both stages depends on the desired end product.

"Slurry reactor" designates any reactor such as a continuous or simple batch stirred tank reactor or loop reactor operating in bulk or slurry, including supercritical conditions, in which the polymer forms in particulate form.

Preferably, the slurry reactor in the inventive process is operated as a bulk reactor. "Bulk" means a polymerisation in a reaction medium comprising at least 60 wt.-% propylene monomer.

Preferably, the bulk reactor is a loop reactor.

Further preferred, in the inventive process the temperature in the loop reactor is in the range of 60 to 100° C. In case in the loop reactor a propylene homopolymer is produced the temperature is preferably in the range of 65 to 95° C., more preferably in the range of 70 to 85° C. In turn in case in the loop reactor a propylene random copolymer is produced the temperature is preferably in the range of 60 to 80° C.

Still further preferred, in the inventive process the temperature in the gas phase reactor(s) is preferably in the range of 65 to 100° C., more preferably in the range of 75 to 85° C.

The present invention is further described by way of examples.

EXAMPLES

1. Definitions/Measuring Methods

The following definitions of terms and determination methods apply for the above general description of the invention as well as to the below examples unless otherwise defined.

Comonomer Content

Comonomer content (wt %) is determined in a known manner based on Fourier transform infrared spectroscopy (FTIR) determination calibrated with $C^{13}$-NMR.

Particle size distribution and the average particle sizes of the catalysts were determined by static image analysis. A system comprising of a Zeiss Axioplan light microscope equipped with a Flea2 Digital camera from Point Grey Research Inc., a motorised XY-stage from Märzhäuser with Corvus controller and a PC was used to acquire images of catalyst particles dispersed in oil on glass slides. Calibration of the system was performed with a stage micrometer (2 mm, with 0.01 mm divisions).

A suspension of approximately 2 to 3 wt.-% of the catalyst in oil was prepared for the analysis. After homogenising the suspension three samples were deposited on separate microscope slides and covered with a cover glass. The slides were placed on the microscope stage and a magnification of 10× (numerical aperture 0.30) was chosen to obtain approximately 10 to 20 particles in the measurement frame. Illumination was adjusted to give a light background and the microscope was focused on the sample particles. For each slide approximately 500 images were scanned in a raster pattern and stored. Using image analysis software the images were processed and analysed. For each image the isolated particles which did not overlap the image edges were counted and their area, equivalent circular diameter and other parameters recorded. In total, a minimum of 15 000 particles were counted. For the final results, the particles from all images were grouped in to size classes and presented as a histogram. Size classes were determined by $x_i/x_{i-1}=1,0977$, where $x_i$ is the upper and $x_{i-1}$ the lower particle size of the ith size class. Particles assigned to a given size class have a diameter that is equal to or greater than $x_{i-1}$ and less than $x_i$. The particles size distribution, variance of particle size distribution and average particle sizes ($\tilde{x}_{1,0}$, $\tilde{x}_{2,0}$, $\tilde{x}_{3,0}$, $\tilde{x}_{1,2}$ and $\tilde{x}_{1,3}$) were calculated according to ISO 9276-1:1998(E) and ISO 9276-2:2001(E).

ICP Analysis

The elemental analysis of a catalyst was performed by taking a solid sample of mass, M, cooling over dry ice. Samples were diluted up to a known volume, V, by dissolving in nitric acid ($HNO_3$, 65%, 5% of V) and freshly deionised (DI) water (5% of V). The solution was then added to hydrofluoric acid (HF, 40%, 3% of V), diluted with DI water up to the final volume, V, and left to stabilize for two hours.

The analysis was run at room temperature using a Thermo Elemental IRIS Advantage XUV Inductively Coupled Plasma—Atomic Excitation Spectrometer (ICP-AES) which was calibrated immediately before analysis using a blank (a solution of 5% $HNO_3$, 3% HF in DI water), a low standard (10 ppm Al in a solution of 5% $HNO_3$, 3% HF in DI water), a high standard (50 ppm Al, 50 ppm Hf, 20 ppm Zr in a solution of 5% $HNO_3$, 3% HF in DI water) and a quality control sample (20 ppm Al, 20 ppm Hf, 10 ppm Zr in a solution of 5% $HNO_3$, 3% HF in DI water).

The content of transition metal was monitored using the 282.022 nm and 339.980 nm lines and the content for zirconium using 339.198 nm line. The content of aluminium was monitored via the 167.081 nm line, when Al concentration in ICP sample was between 0-10 ppm and via the 396.152 nm line for Al concentrations between 10-100 ppm.

The reported values, required to be between 0 and 100, or further dilution is required, are an average of three successive aliquots taken from the same sample and are related back to the original catalyst using equation 1.

$$C = \frac{R \times V}{M} \quad \text{Equation 1}$$

wherein
C is the concentration in ppm, related to % content by a factor of 10,000
R is the reported value from the ICP-AES
V is the total volume of dilution in ml
M is the original mass of sample in g If dilution was required then this also needs to be taken into account by multiplication of C by the dilution factor.

Catalyst Activity/Catalyst Productivity

A 5 liter stainless steel reactor was used for propylene polymerizations. 1100 g of liquid propylene (Borealis polymerization grade) was fed to the reactor. 0.2 ml triethylaluminum (100%, purchased from Crompton) was fed as a scavenger and 15 mmol hydrogen as chain transfer agent. The reactor temperature was set to 30° C. The catalyst was flushed into to the reactor with nitrogen overpressure. The reactor was heated up to 70° C. in a period of 15 minutes. After polymerisation for 30 minutes the remaining propylene was flushed out and the polymer was dried and weighted.

Polymer yield (based on 15, 30, 60 or 120 min polymerisation) is determined Catalyst productivity is polymer yield [kg] divided by catalyst amount [g]. Catalyst activity is catalyst productivity divided by time [hour(s)]=kgPP/[g cat×h].

Chemicals

MAO was purchased from Albermarle and used as a 30 wt-% solution in toluene.

Perfluoroalkylethyl acrylate esters (CAS number 65605-70-1) were purchased from the Cytonix Corporation, dried and degassed prior to use.

Hexadecafluoro-1,3-dimethylcyclohexane was dried and degassed prior to use.

Propylene was provided by Borealis and adequately purified before use.

Triethylaluminum was purchased from Crompton and used in pure form.

Hydrogen is provided by AGA and purified before use.

All the chemicals and chemical reactions were handled under an inert gas atmosphere using Schlenk and glovebox techniques, with oven-dried glassware, syringes or needles.

2. Preparation of the Examples

Inventive Example

Catalyst Preparation Preparation of Metallocene/MAO Complex Solution Containing Surfactant 0.2 ml of perfluoroalkylethyl acrylate esters (surfactant) having different fluorinated chain lengths was dissolved in 3 ml toluene in a septa bottle. 0.5 ml of this solution was added into 6 ml MAO (30 w % MAO in toluene). It was stirred for 30 min at 20° C. 84.4 mg of metallocene (rac-cyclohexyl(methyl)silanediyl-bis(2-methyl-4-(4'-tert-butyl-phenyl)inden-1-yl) zirconium dichloride) was mixed and a bright red complex solution was formed.

Preparation of Emulsion

Into the 100 ml glas emulsion reactor 50 ml hexadecafluoro-1,3-dimethylcyclohexane was added. It was cooled down to −9° C. for 20 min. An emulsion was made by adding 6 ml of previously prepared metallocene/MAO/surfactant-solution. Colour of the emulsion was red. Emulsion was stirred for 15 min (612 rpm) at −5° C. The glass receiving reactor (volume 250 ml) was connected to the argon line and heated at 90° C. The circulated, filtered and argon bubbled hexadecafluoro-1,3-dimethylcyclohexane (100 ml) was added by using a syringe to the glass reactor. Then the solvent was heated at 90° C. for 30 min with stirring speed 496 rpm.

Separation of Solid Catalysts

The emulsion was transferred into the 100 ml of hot hexadecafluoro-1,3-dimethylcyclohexane (stirring 612 rpm) by using a teflon tube. Temperature decreased from +89° C. to 76 t-80° C. during the addition of the emulsion. A solid catalyst particles were formed immediately. The mixture was let cool down to 35° C. under stirring for 35 min. hexadecafluoro-1,3-dimethylcyclohexane was siphoned out and the remaining red catalyst dried in argon flow at 50° C. for one hour.

Comparative Example

Preparation of Surfactant Stock Solution 1 ml surfactant (2,2,3,3,4,4,5,5,6,6,7,7,8,8,9,9,9-heptadecafluoronyl)oxirane (PFPO) and 4 ml of hexadecafluoro-1,3-dimethylcyclohexane (PFC)

A catalyst solution was formed by reaction of 77.7 mg of rac-cyclohexyl(methyl)silanediyl-bis(2-methyl-4-(4'-tert-butyl-phenyl)inden-1-yl) zirconium dichloride with 5.4 mL of a 30 wt-.% MAO solution in toluene during 30 minutes inside the glovebox. In a 100 mL emulsification glass reactor equipped with "open baffles" and an overhead stirrer, a liquid-liquid 2-phase system was formed at −9° C. from 50 mL of hexadecafluoro-1,3-dimethylcyclohexane and the previously prepared 5.4 ml catalyst solution. When 0.4 ml of stock surfactant solution of PFPO was added to the system, a red-orange emulsion was generated by stirring at 612 rpm. The system was stirred for further 15 min at −5° C. and 612 rpm. The emulsion was then transferred via a 2/4 teflon tube to 100 mL of hot 90° C. PFC and stirred at 496 rpm. During the addition of cold emulsion to hot receiving solution, the temperature was decreasing to 76 to 80° C. After 15 minutes, the oil bath was removed and the mixing speed was reduced to 300 rpm for 35 more minutes and finally turned off when temperature was about 35° C. The catalyst was left to settle up on top of the hexadecafluoro-1,3-dimethylcyclohexane solvent and after 35 minutes this solvent was siphoned off The remaining red-orange catalyst was dried for 60 minutes at 50° C. by argon flushing, but a change of colour from red to white was observed. The drying procedure was then continued under vacuum during 1 hour at room temperature. 1 g of a red-orange free flowing powder was retrieved.

ICP analysis: Al=26.4 wt-%; Zr=0.32 wt-%
Polymerisation activity=26.5 kg-PP/g-cat/h Polymerization Procedure A 5 liter stainless steel reactor was used for propylene polymerizations. 1100 g of liquid propylene was fed to reactor. 0.2 ml triethylaluminum was fed as a scavenger and 15 mmol hydrogen as chain transfer agent. Reactor temperature was set to 30° C. 30 mg catalyst was flushed into to the reactor with nitrogen overpressure. The reactor was heated up to 70° C. in a period of about 15 minutes (prepolymerization). Pressure was 34 bar (Table 1A). Polymerization was accomplished after that under stable conditions according to Table 1B from 0 up to 120 min. After polymerization, propylene was flushed out and the polymer was dried and weighted.

TABLE 1A

Prepolymerization results

| | | [min] 15 Catalyst type | |
|---|---|---|---|
| | | CE 1 | E 1 |
| | | Surfactant | |
| Prepolymerisation | — | $S^c$ | $S^i$ |
| Yield | [g PP] | 121 | 29 |
| tP | [kgPP/g cat] | 4.0 | 1.0 |
| tA | [kgPP/((g cat) × h)] | 16.0 | 4.0 |
| cP | [kgPP/g cat] | 4.0 | 1.0 |
| cA | [kgPP/((g cat) × h)] | 16.0 | 4.0 |

TABLE 1B

Polymerization results

| | | [min] | | | | | |
|---|---|---|---|---|---|---|---|
| | | 30 | | 60 | | 120 | |
| | | Catalyst type | | | | | |
| | | CE 1 | E 1 | CE 1 | E 1 | CE 1 | E 1 |
| | | Surfactant | | | | | |
| Polymerisation | — | $S^c$ | $S^i$ | $S^c$ | $S^i$ | $S^c$ | $S^i$ |
| Yield | [g PP] | 424 | 215 | 412 | 373 | 0 | 632 |
| tP | [kgPP/g cat] | 14.1 | 7.2 | 13.7 | 12.4 | 0 | 21.1 |
| tA | [kgPP/((g cat) × h)] | 28.2 | 14.4 | 13.7 | 12.4 | 0 | 10.5 |
| cP | [kgPP/g cat] | 11.7 | 6.2 | 0 | 5.3 | 0 | 8.6 |
| cA | [kgPP/((g cat) × h)] | 23.4 | 12.4 | 0 | 10.6 | 0 | 8.6 |

$S^c$ surfactant of comparative example
$S^i$ surfactant of inventive example
tP total productivity
tA total activity
cP calculated productivity during each step (prepolymerisation (15 min), after 30 min, after 60 min, after 120 min polymerisations: productivity during step = (polymer yield − yield in previous step(s))/catalyst amount
cA calculated activity during each step (prepolymerisation 15 min, after 30 min, after 60 min, after 120 min polymerisation): activity during step = (calculated productivity during step)/(time in minutes/60)

As can be seen from the table catalyst of the comparative example is totally killed after one hour polymerisation, whereas the catalyst used in the process of the invention has still activity/productivity, which have been remained stable, i.e. they have been remained approximately on the same level, with only minor decrease in activity.

The invention claimed is:
1. A process for the preparation of a polypropylene, comprising:
(A) producing solid catalyst particles by:
(a) preparing a solution (A) comprising:
(i) a transition metal compound of formula (I):

$$L_m R_n M X_q \quad (I),$$

wherein:
"M" is a transition metal of anyone of the groups 3 to 10 of the periodic table (IUPAC),
each "X" is independently a monovalent anionic σ-ligand,
each "L" is independently an organic ligand which coordinates to the transition metal (M),
each "R" is a bridging group linking two organic ligands (L),
"m" is 2 or 3, "n" is 0, 1 or 2,
"q" is 1, 2 or 3, and
"m"+"q" is equal to the valency of the transition metal (M),
  (ii) a cocatalyst (Co) comprising an element (E) of group 13 of the periodic table (IUPAC), and
  (iii) a solvent (A'),
(b) generating an emulsion by dispersing solution (A) in a solvent (B) and in the presence of a surfactant (S), wherein:
  (i) solvent (B) constitutes the continuous phase of the emulsion,
  (ii) solution (A) constitutes in form of droplets the dispersed phase of the emulsion,
  (iii) the transition metal compound of formula (I) and the cocatalyst (Co) are present in the droplets, and
  (iv) surfactant (S) is:
    (α) at least one compound (SP) of formula (II), or
    (β) a reaction product (RP) of at least one compound (SP) of formula (II) and a compound (C) comprising an element (E) of group 13 of the periodic table (IUPAC), wherein formula (II) is:

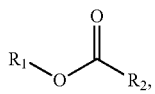

(II)

wherein $R_1$ is a semi-, highly- or perhalogenated hydrocarbon residue, $R_2$ is a residue of $-C(R_3)=C(R_{3'})-R_4$, and $R_3$, $R_4$, and $R_{3'}$ are independently from each other selected from the group consisting of H, $C_1$ to $C_{20}$ alkyl, $C_2$ to $C_{20}$ alkenyl, and $C_2$ to $C_{20}$ alkinyl,
(c) solidifying said dispersed phase to convert said droplets to solid catalyst particles, and
(d) recovering said solid catalyst particles; and
(B) subsequently polymerizing propylene optionally with a comonomer selected from the group consisting of ethylene, a $C_4$-$C_{20}$ α-olefin, and mixtures thereof, in the presence of the solid catalyst particles of step (A).

2. The process according to claim 1, wherein a loss of activity of the solid catalyst particles during polymerization is:
  (i) a loss of activity (LA1) of the solid catalyst particles during polymerization is at most 20%, wherein the loss of activity (LA1) is defined by formula (A1):

$$LA1 = \left(1 - \frac{A(60)}{A(30)}\right) \times 100,\quad (A1)$$

or
  (ii) a loss of activity (LA2) of the solid catalyst particles during polymerization is at most 25%, wherein the loss of activity (LA2) is defined by formula (A2):

$$LA2 = \left(1 - \frac{A(120)}{A(60)}\right) \times 100,\quad (A2)$$

wherein A(30) is the calculated activity for polymerization period of 30 minutes, A(60) is the calculated activity for polymerization period of 60 minutes, and A(120) is the calculated activity for polymerization period of 120 minutes.

3. The process according to claim 1, wherein:
(a) the ligands (X) are independently selected from the group consisting of hydrogen, halogen, $C_1$ to $C_{20}$ alkyl, $C_1$ to $C_{20}$ alkoxy, $C_1$ to $C_{20}$ alkenyl, $C_1$ to $C_{20}$ alkinyl, $C_3$ to $C_{12}$ cycloalkyl, $C_6$ to $C_{20}$ aryl, $C_6$ to $C_{20}$ aryloxy, $C_7$ to $C_{20}$ arylalkyl, $C_7$ to $C_{20}$ arylalkenyl, $-SR''$, $-PR''_3$, $-SiR''_3$, $-OSiR''_3$, and $-NR''$, wherein each $R''$ is independently hydrogen, $C_1$ to $C_{20}$ alkyl, $C_1$ to $C_{20}$ alkenyl, $C_1$ to $C_{20}$ alkinyl, $C_3$ to $C_{12}$ cycloalkyl, or $C_6$ to $C_{20}$ aryl, or
(b) at least one organic ligand (L) is selected from the group consisting of unsubstituted cyclopentadienyl ligand, substituted cyclopentadienyl ligand, unsubstituted indenyl ligand, substituted indenyl ligand, unsubstituted fluorenyl ligand, and substituted fluorenyl ligand.

4. The process according to claim 1, wherein:
(a) transition metal (M) is zirconium (Zr), hafnium (Hf), or titanium (Ti), or
(b) the bridging group (R) independently has the formula (IV):

$$-Y(R')(R'')-\quad (IV),$$

wherein Y is C, Si, or Ge, and R' and R'' are independently selected from the group consisting of H, $C_1$ to $C_{20}$ alkyl, $C_4$ to $C_{10}$ cycloalkyl, $C_6$ to $C_{12}$ aryl, $C_7$ to $C_{12}$ arylalkyl, and trimethylsilyl.

5. The process according to claim 1, wherein at least one organic ligand (L) comprises one or more residues independently selected from the group consisting of halogen, $C_1$ to $C_{20}$ alkyl, $C_1$ to $C_{20}$ alkenyl, $C_1$ to $C_{20}$ alkinyl, $C_3$ to $C_{12}$ cycloalkyl, $C_6$ to $C_{20}$ aryl, $C_7$ to $C_{20}$ arylalkyl, $C_3$ to $C_{12}$ cycloalkyl which contains 1, 2, 3 or 4 heteroatom(s) in the ring moiety, $C_6$ to $C_{20}$ heteroaryl, and $C_1$ to $C_{20}$ haloalkyl.

6. The process according to claim 1, wherein at least one of co-catalyst (Co) or compound (C) is a trialkylaluminium or aluminoxane compound.

7. The process according to claim 1, wherein solvent (A') is an aromatic hydrocarbon, or solvent (B) is a perfluoroalkane.

8. The process according to claim 1, wherein the reaction product (RP) is obtained by contacting at least one compound (SP) of formula (II) with a compound (C) comprising an element (E) of group 13 of the periodic table (IUPAC), said contacting takes place in a temperature range of −20 to 60° C.

9. The process according to claim 8, wherein the surfactant (S) being the reaction product (RP) is first produced and subsequently added to the mixture of the solution (A) and the solvent (B).

10. The process according to claim 1, wherein at least one of $R_1$ of the compound (SP) of formula (II) is a perfluorinated $C_4$ to $C_{25}$ hydrocarbon residue, or (b) $R_2$ of the compound (SP) of formula (II) is CH=CH—$R_5$, wherein $R_5$, is H or $C_1$ to $C_{10}$ alkyl.

11. The process according to claim 1, wherein surfactant (S) is solved in the same solvent as used as solvent (A), or surfactant (S) is added during the formation of the emulsion.

12. The process according to claim 1, wherein solidifying is accomplished by a temperature change of more than 30° C. within less than 10 seconds.

13. The process according to claim 1, wherein the solid catalyst particles do not comprise any catalytically inert support material.

14. The process according to claim 1, wherein the polypropylene is prepared in a multistage process.

15. The process according to claim 14, wherein the multistage process comprises at least one loop reactor, optionally in combination with a gas phase reactor.

16. The process according to claim 1, wherein no prepolymerization step has been used.

* * * * *